United States Patent [19]

Scotton et al.

[11] Patent Number: 5,524,021

[45] Date of Patent: Jun. 4, 1996

[54] METHOD OF POWER CONSERVATION

[75] Inventors: Geoffrey R. Scotton, Woodway, Wash.; Marek Dutkiewica, Delta, Canada

[73] Assignee: Motorola, Inc., Schaumburg, Ill.

[21] Appl. No.: 222,047

[22] Filed: Apr. 4, 1994

[51] Int. Cl.⁶ .................. H04B 1/38; H04Q 7/32
[52] U.S. Cl. .................. 375/222; 455/38.3; 455/343
[58] Field of Search .................. 375/8, 71; 455/38.3, 455/343

[56] References Cited

U.S. PATENT DOCUMENTS

| | | | |
|---|---|---|---|
| 4,878,996 | 10/1989 | Rose | 375/222 |
| 5,095,308 | 3/1992 | Hewitt | 455/343 |
| 5,175,870 | 12/1992 | Mabey et al. | 455/343 |
| 5,206,855 | 4/1993 | Schwendeman et al. | 370/50 |
| 5,241,542 | 8/1993 | Natarajan et al. | 455/38.3 |
| 5,276,680 | 1/1994 | Messenger | 455/38.3 |
| 5,381,414 | 1/1995 | Gibson | 455/343 |
| 5,406,613 | 4/1995 | Peponides et al. | 455/343 |

FOREIGN PATENT DOCUMENTS 204549  8/1989  Japan ......................................... 375/8

*Primary Examiner*—Stephen Chin
*Assistant Examiner*—Jeffrey W. Gluck
*Attorney, Agent, or Firm*—Charles W. Bethards

[57] ABSTRACT

A method of modem power conservation used in a data communications system having an infrastructure (101), and a modem (103), the modem registered with the infrastructure and adapted to provide data communications between a host terminal (105) and the infrastructure (101), the method including the steps of: receiving, at the modem (103), a message: determining that the message is not deliverable to the host terminal (105): and responsive thereto entering, at the modem (103), a power conservation mode. An alternative method directed to the same purposes includes the steps of: entering, at the modem (103), a power conservation mode after a first predetermined time has lapsed without message activity: exiting the power conservation mode after a second predetermined time has lapsed: and finally registering with the infrastructure (101).

27 Claims, 3 Drawing Sheets

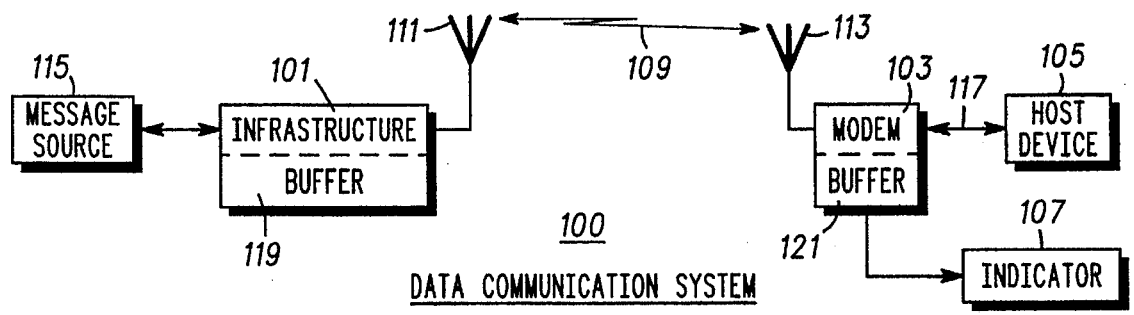
DATA COMMUNICATION SYSTEM
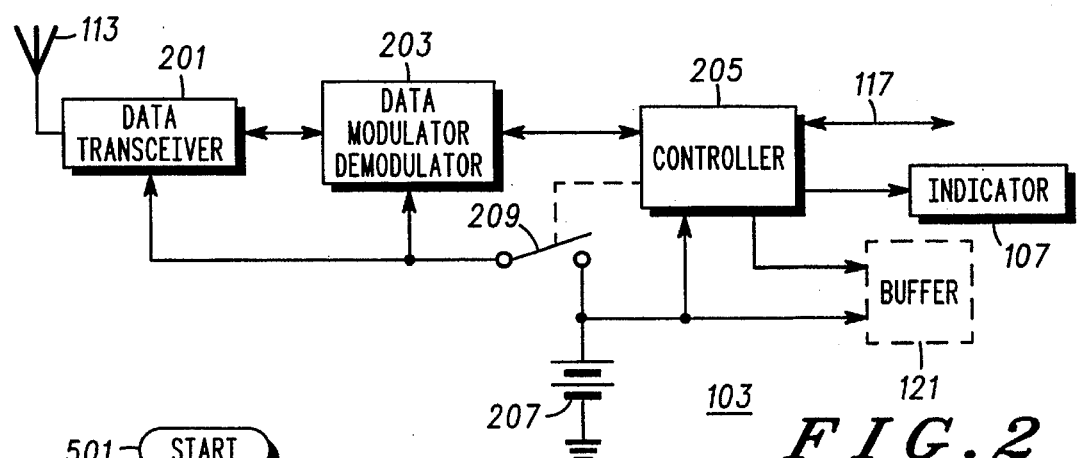
FIG. 2
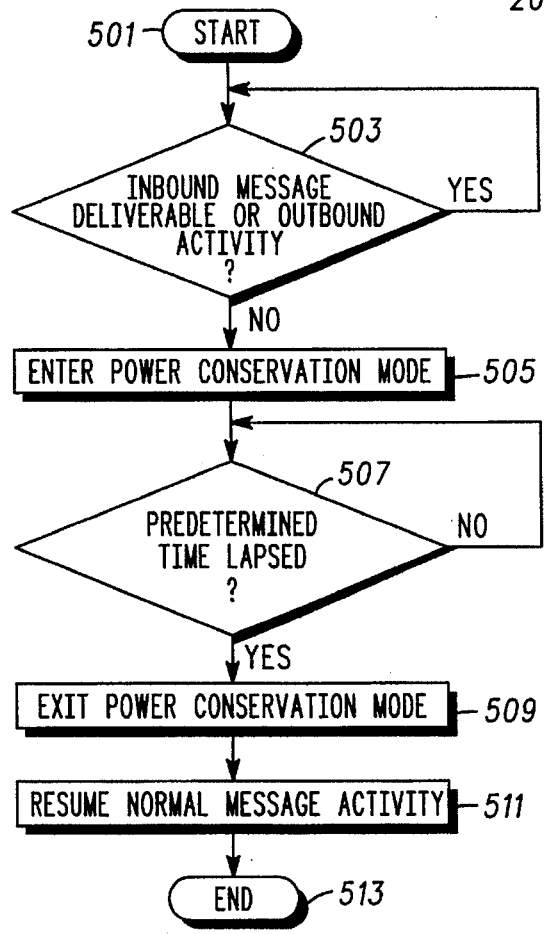
FIG. 5

METHOD OF POWER CONSERVATION

FIELD OF THE INVENTION

The instant disclosure deals with power conservation techniques and more particularly but not limited to methods of power conservation having applicability within communications systems.

BACKGROUND OF THE INVENTION

The need for power conservation is known. All else being equal and assuming an upper bound on energy density for battery technology, there is a direct tradeoff between portable product package weight and the length of time the product may be used without recharging or replacing an associated battery. Removing the equality qualifier, practitioners continually struggle with tradeoffs and compromises among product utility, product processing speed, memory, capability, product size, product weight, useful battery life, and battery technology with its attendant limitations. Almost all agree that compromise is the operative word, no really satisfactory answer having yet been found, and additional power conservation approaches are needed.

A particularly appropriate case in point is that of battery powered data terminals, and more specifically their associated data modems. Wireless data communications systems, protocols, network or infrastructure equipment, and modems together with their host terminals have evolved to provide communications service to a growing user base on both outbound and inbound channels. This data communications service is highly dependent on the specific user and that user's needs, but may be characterized as sporadic and highly interactive with varying message lengths, content, and protocols. As a result of these characteristics equipment suppliers necessarily have emphasized processing speed, accuracy, and user interaction often at the expense of power consumption. More recently the data communications marketplace has begun, and is expected to continue, to demand portable data terminals (and thus data modems) that are the functional equivalent of a portable computer combined with a portable two way radio. This market requirement has focused attention on product size and weight (and on battery life) and power conservation, since they affect size and weight.

In contrast, personal paging systems, protocols, and equipment have evolved to service a large user base on outbound channels only, on a non-real-time critical basis, where message lengths and content are limited. Premiums are placed on low system cost message delivery and subscriber unit battery life. Various techniques for conserving power (and hence extending battery life) in a paging environment have been employed. However, all such techniques are sub optimal or can be significantly improved upon once the basic limitation of paging systems, specifically a one-way or outbound-only channel, is eliminated.

Clearly a need exists for inventive approaches to conserving power (and thus extending the battery life) of portable communications equipment and more specifically data communications modems.

BRIEF DESCRIPTION OF THE DRAWINGS

The features of the present invention that are believed to be novel are set forth with particularity in the appended claims. However, the invention, together with further advantages thereof, may best be understood by reference to the accompanying drawings wherein:

FIG. 1 is a block diagram of a wireless data communications system suitable for employing an embodiment of the instant invention.

FIG. 2 is a block diagram of a data terminal adaptable for operation in the FIG. 1 system.

FIG. 5 is a flow chart in accordance with a further alternative method embodiment of the instant invention.

DETAILED DESCRIPTION OF A PREFERRED EMBODIMENT

Figure 3:
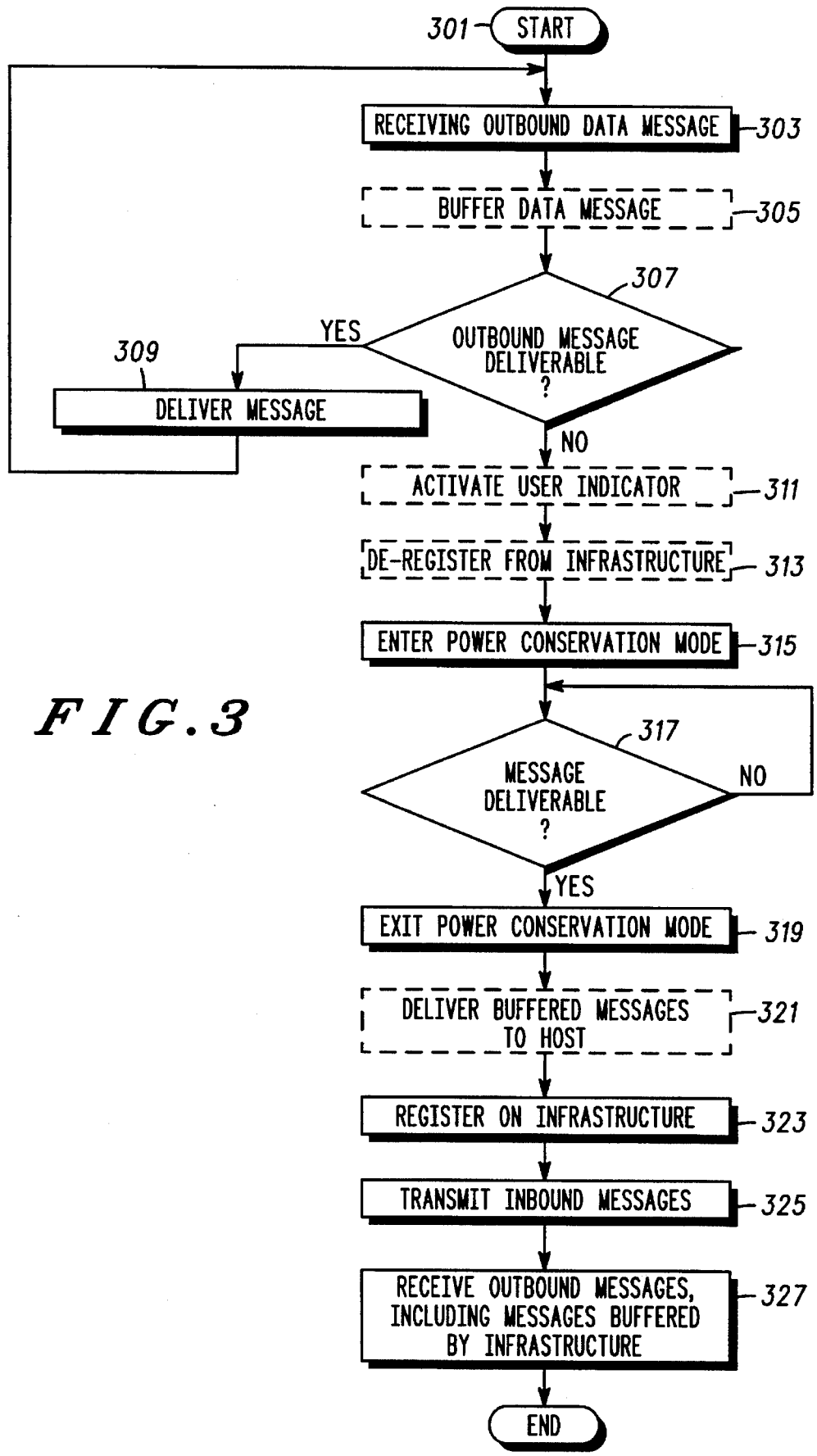
FIG. 3 is a flow chart in accordance with a preferred method embodiment of the instant invention.

Generally, the present invention deals with methods of conserving power in a wireless communications device or data modem. The modem, after identifying various situations where data communications is not possible for reasons beyond the influence of the modem, enters a power conservation mode; the modem subsequently returns to normal operation when such a situation likely no longer exists. A given data communications system may include an infrastructure or network, a modem, and a host or user terminal, where the modem is registered with the infrastructure and adapted to provide data communications between the host terminal and the infrastructure. The modem may employ a method of power conservation that includes the steps of: receiving, at the modem, a message: determining that the message is not deliverable to the host terminal: and then entering a power conservation mode. This method may be enhanced by adding one or more of the following additional steps: activating an indicator that denotes the message for a user: or de-registering the modem from the infrastructure prior to entering the power conservation mode.

This method may be further augmented by including a step of determining when the message is deliverable to the host terminal, exiting the power conservation mode, and registering with the infrastructure when that is appropriate. After this the modem may receive non-acknowledged messages stored by the infrastructure while the modem was in the power conservation mode. One way of determining that messages are now deliverable results when the host terminal initiates an inbound message. In this situation (after the modem registers with the infrastructure) the inbound message would be transmitted.

An alternative method embodiment of the instant invention given the same environment, etc. includes the steps of: entering, at the modem, a power conservation mode after a first predetermined time has lapsed without message activity: then exiting the power conservation mode, after a second predetermined time has lapsed, and registering with the infrastructure. The step of entering may include de-registering with the infrastructure or activating an indicator. After exiting the power conservation mode the modem may receive non-acknowledged messages stored by the infrastructure while the modem was in the power conservation mode. Additionally, the modem may exit the power conservation mode when the host terminal initiates an inbound message and transmit the inbound message. Various combinations of the above steps may be employed to further advantageously employ the instant invention.

The instant invention can be more fully understood with reference to the figures in which FIG. 1 depicts a data communications system (100). The data communications system (100) includes a message source (115) shown coupled to an infrastructure (101) that includes a buffer (119). The infrastructure (101) includes a transceiver or base station coupled to an antenna (111) and operates to receive and transmit radio signals over a wireless radio channel (109). The radio signals are transmitted from or received by an antenna (113) that is coupled to a modem (103). The modem (103), described more fully below, includes a buffer (121) and is coupled to an indicator (107). The modem (103) operates to convert radio signals into data messages and vice versa, in addition to establishing and maintaining the radio communications link with the infrastructure (101). The data messages are supplied to or received from a host device (105), referred to here alternatively as the host, host device, or host terminal, at input/output (117). It should be noted that while FIG. 1 depicts only one radio channel, one modem, and one infrastructure antenna, a practical system may include a plurality of each. Generally, the data communications system (100) is intended to supply specific messages to/from specific host devices in a largely transparent (to end users) fashion.

The modem may be more fully described with reference to FIG. 2 in which like reference numerals refer to like elements from FIG. 1. The antenna (113) is coupled to a data transceiver (201). The transceiver (201) includes a receiver and a transmitter and associated functions (not specifically shown) all well known, and operates to convert radio signals at the antenna (113) to a data wave form that is coupled to a data modulator/demodulator (203), or alternatively to convert a data wave form, supplied by the data modulator/demodulator (203), to a radio signal for transmission over the radio channel (109).

The data modulator/demodulator (203) operates to convert the analog data wave form provided by the data transceiver (201) to a digital form or binary symbol representation, or alternatively to convert digital data to an analog wave form suitable for further transmission by the data transceiver (201). The digital form of the data produced by the data modulator/demodulator (203) is provided to the controller (205) as a data message. Digital data that is converted by the data modulator/demodulator (203) to an analog wave form is supplied from the controller (205).

The controller (205) provides various control functions for the other elements of the modem (103) and manages the interface between the modem (103) and the host device (105) at input/output (117). Such control functions include routing data received or to be transmitted to and from a buffer (121), as required, and indicating receipt of data by, for example, illuminating an indicator (107). The controller (205) further controls whether and when the modem (103) enters a power conservation or lower power consumption state in accordance with the method embodiments of the instant invention as further described below.

This power control function is accomplished under appropriate circumstances by selectively operating a switch (209) under the control of the controller (205). The switch (209) operates to couple or de-couple a power source (207), such as a battery, to certain higher consumption (non-essential in some circumstances) functions such as the data transceiver (201) and data modulator/demodulator (203). For the sake of simplicity, FIG. 2 depicts all power to the respective functional elements as flowing through the switch (209). In practice it may be preferable to switch only a portion of the power to these elements, in which case only a portion of the relevant element would enter a power conservation state. In addition to controlling the switch (209), the controller (205) may implement other power conservation procedures, such as entering a lower power standby mode or controlling the buffer (121) to enter a standby mode.

The controller (205) receives data messages from, and provides or delivers data messages to, the host (105) via the input/output (117). Generally, the instant invention contemplates that the host (105) and the modem (103) may not always be coupled together at the input/output (117), or that the host may be otherwise occupied or unavailable. Under these circumstances the modem (103) will not be able, either to deliver or receive data messages from the host (105).

The modem device, including component parts as described above and as shown in FIG. 2, is more fully described in and may be more fully appreciated by reference to the Motorola Service Manual titled InfoTAC Technical Manual and designated 68PO2939C95. The data transceiver described in this manual is well known. A digital signal processor (MCM56001) is used for the data modulator/demodulator function. A Motorola HC11 controller (M68HC11A1) provides the controller (205) function. The balance of the product includes generally a liquid crystal display used for various indicators, a 128K random access memory used for the buffer, a rechargeable battery pack as the power source, a self contained antenna, and RS-232C serial lines that are provided to connect the host (105) to the modem (103). Finally, various power switching circuitry, well-known in the art, is provided to selectively enable component power control or enter the power conservation state.

With the above as a setting, a detailed description of a preferred method embodiment of the instant invention will be provided with reference to FIG. 3. The instant invention contemplates a data communications system (100) having an infrastructure (101) and a modem (103) remotely located. The modem (103) is registered with the infrastructure and adapted to provide data communications between a host terminal and the infrastructure. Being registered refers to a condition whereby the infrastructure and the modem are cognizant of the fact that each other exists and that a potential wireless communications link between the two may be established if either desires to deliver a message to the other.

The modem (103) employs a method of modem power conservation, starting at step (301), that includes at step (303) receiving, at the modem, a message. This message, specifically a data message, is intended to be delivered by the modem to the host device (105) or terminal and may optionally be buffered or stored at step (305). In any event, the modem determines whether the message is deliverable to the host terminal at step (307), and if so delivers the message at step (309). If the message is not deliverable to the host terminal, as in for example where the host terminal is otherwise occupied, the host terminal has been powered down, or the modem has been temporarily disconnected from the host terminal, the modem may optionally activate the user indicator (107) denoting the message at step (311) and de-register from the network at step (313).

In any event the modem then enters a power conservation mode at step (315), responsive to the determination at step (307). The power conservation mode includes removing, by opening the switch (209), all or substantially all power from non-essential functions such as the data transceiver (201) and data modulator/demodulator (203) and may entail the controller (205) assuming a low power consumption state, all such actions motivated by a desire to minimize power consumption and thus extend the battery's life. The modem remains in the low power consumption state until the data message is deliverable to the host terminal as determined at step (317). This determination is accomplished by monitoring the host input/output (117) for a change, in for example, a Data Terminal Ready (DTR) serial pin state, signifying the presence and availability of the host terminal (105). This determination may result from the host initiating an inbound message or requesting that an inbound message be transmitted.

Having determined that the data message is deliverable to the host terminal, the modem exits the power conservation mode at step (319) by, for example, reapplying power to previously unpowered components. The buffered data message, if any from step (305), is then delivered to the host terminal at step (321) via the input/output (117). The modem then registers with the infrastructure at step (323) by transmitting a registration data message, etc., in accordance with well known routine procedures specific to the transport protocol being utilized. The modem is then ready to support ordinary inbound or outbound data message traffic that may include transmitting inbound messages at step (325) or receiving, at step (327), outbound data messages, including those messages that were buffered by the infrastructure while the modem was in the power conservation mode. Buffered messages may include acknowledge required or non-acknowledge required outbound messages. Acknowledge (ACK) required messages are data messages that require receipt confirmation to be transmitted by the modem. Non-acknowledge required outbound data messages are data messages not requiring receipt confirmation to be transmitted by the modem.

If the host (105) initiates an inbound message, (representing a determination that messages are deliverable) at step (317) by, for example, providing the modem with data at the input/output (117) that would generate an inbound data message, the modem exits the power conservation mode at step (319) and registers with the infrastructure at step (323) by transmitting a registration data message to the; infrastructure. The modem then transmits pending inbound data messages to the infrastructure at step (325). The modem is then prepared, at step (327), to receive subsequent outbound ACK required and non-ACK required type data messages that had been buffered by the infrastructure while the modem was in the power conservation mode.

Figure 4:
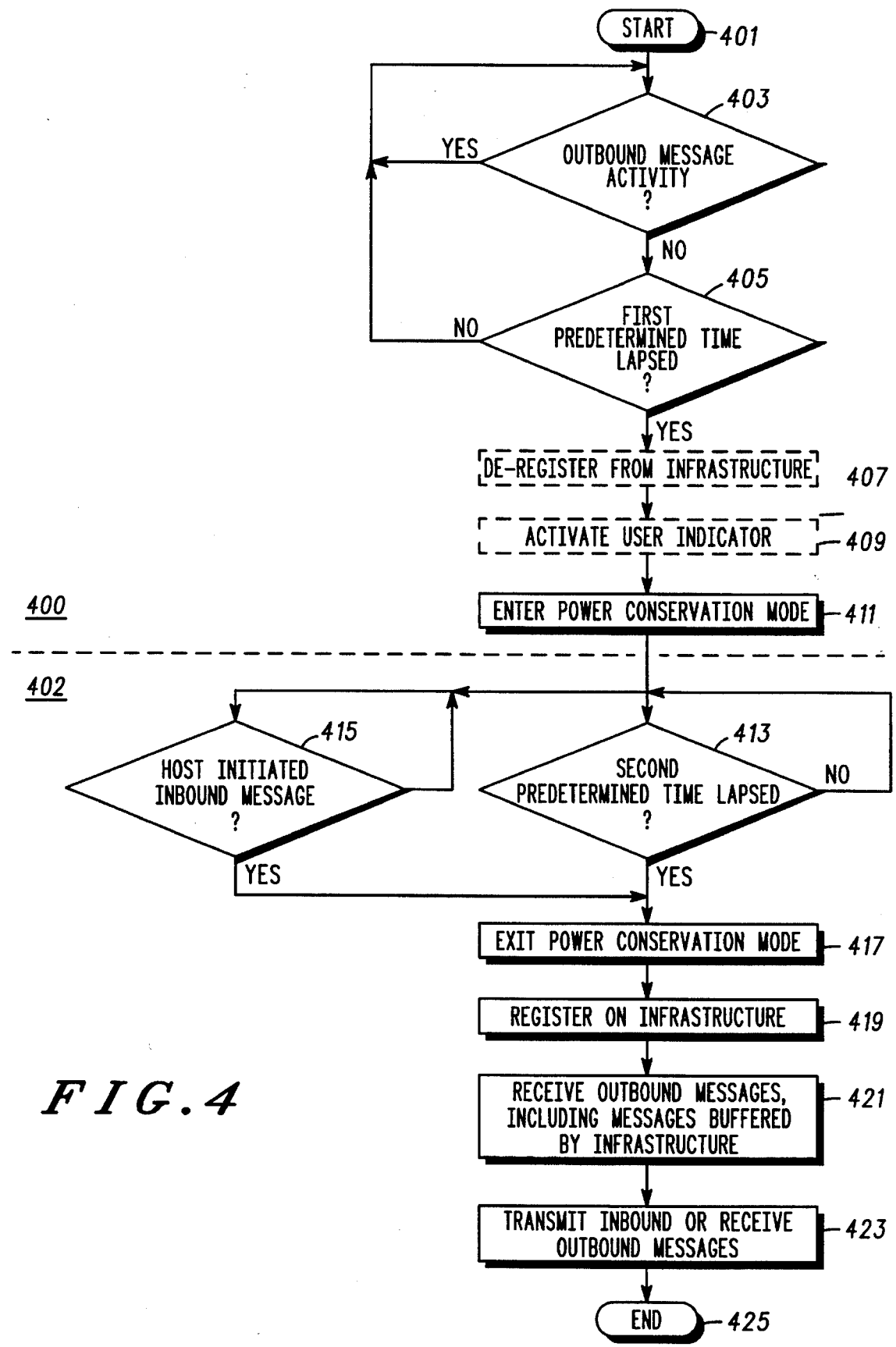
FIG. 4 is a flow chart in accordance with an alternative method embodiment of the instant invention.

Referring to FIG. 4, and presuming a similar environment, a detailed description of an alternative method embodiment of the instant invention will be provided. FIG. 4 generally includes two steps, specifically entering (400), at the modem, a power conservation mode after a first predetermined time has lapsed without message activity, and exiting (402) the power conservation mode after a second predetermined time has lapsed, and then registering with the infrastructure.

Starting at step (401) and reviewing the details of step (400), if no message activity is experienced by the modem at step (403) and a first predetermined time has lapsed at step (405) without such activity the modem will enter a power conservation mode at step (411). Message activity is any data message exchange between the host device and the modem, and entering the power conservation mode is accomplished as explained above. Prior to entering the power conservation mode at step (411), the modem may optionally de-register from the infrastructure at step (407) and/or may optionally, at step (409), activate a user indicator.

In any event, turning to the details of step (402), when a second predetermined time has lapsed at step (413) or alternatively the host initiates, as above discussed, an inbound message at step (415) the modem exits the power conservation mode at step (417) and registers on or with the infrastructure at step (419) by transmitting a registration data message to the infrastructure. The modem may then receive outbound ACK required and non-ACK required type data messages, at step (421), that may have been buffered by the infrastructure while the modem was in the power conservation mode, and/or transmit pending inbound data messages to the infrastructure at step (423).

The exact value for the first and second predetermined time(s) will depend on various considerations such as the degree of power conservation desired versus average message latency and channel overhead associated with registration. While various practicalities indicate that a great deal of latitude must be provided for an implementation, respective values of 5 minutes and 30 minutes have been found to provide reasonable results in one application.

From the above disclosed embodiments it will be evident to one skilled in the art that the FIG. 3 and FIG. 4 embodiments may be readily combined in various arrangements to take further advantage of the inventive aspects of each. For example, the message activity elements of FIG. 4 may be combined with the elements of determining that a message is not presently deliverable to a host, as explained in conjunction with FIG. 3, to advantageously provide the power conservation parameters of each.

Referring now to FIG. 5, a further alternative method embodiment of the instant invention in a similar environment will be reviewed. Starting at step (501) the modem determines whether an inbound (modem to infrastructure) message is deliverable to the infrastructure at step (503). Such a determination may be based on some combination of an assessment of channel quality, such as received signal strength or bit error rate, or a successful registration, techniques for any of which are well-known. If the message is not deliverable (such as may be the case if the modem has traveled beyond the service area of the infrastructure) the modem enters a power conservation mode, as previously discussed, at step (505). This may include buffering at the modem the outbound message. After a predetermined time such as 30 minutes has lapsed at step (507) the modem exits the power conservation mode at step (509) and resumes normal message activity at step (511), which activity may include an attempt to register with the infrastructure and one or more repetitions of the process depicted in FIG. 5.

It will be appreciated by those of ordinary skill in the art that the apparatus and methods disclosed provide various methods for conserving power without compromising data communications integrity or otherwise un-necessarily burdening data communications. These inventive methods may be readily and advantageously employed in a wireless packet data modem or other communications device or system to provide power conservation and thus extend battery life. Hence, the present invention, in furtherance of satisfying a long-felt need of wireless data communications, readily facilitates portable data modems by providing an exemplary method of power conservation that can yield a useful battery life from a portable battery size.

It will be apparent to those skilled in the art that the disclosed invention may be modified in numerous ways and may assume many embodiments other than the preferred form specifically set out and described above. Accordingly, it is intended by the appended claims to cover all modifications of the invention which fall within the true spirit and scope of the invention.

What is claimed is:

1. In a data communications system having an infrastructure, and a modem, the modem registered with the infrastructure and adapted to provide data communications between a host terminal and the infrastructure, a method of modem power conservation including the steps of:

receiving, at the modem, a message, determining that said message is not deliverable to the host terminal, and entering, at the modem responsive to said determining step, a power conservation mode.

2. The method of claim 1 further including, after the step of receiving the message, the step of activating an indicator, said indicator denoting receipt of said message.

3. The method of claim 2 further including a step of determining when said message is deliverable to the host terminal and exiting said power conservation mode.

4. The method of claim 3 wherein said step of determining when said message is deliverable resulted from the host terminal initiating an inbound message.

5. The method of claim 4 further including a step of registering with the infrastructure and transmitting said inbound message.

6. The method of claim 1 wherein said step of entering further includes a step of de-registering the modem from the infrastructure.

7. The method of claim 6 further including a step of determining when said message is deliverable to the host terminal and exiting said power conservation mode.

8. The method of claim 7 further including the step of registering with the infrastructure.

9. The method of claim 8 further including a step of receiving, at the modem, non-acknowledged messages stored by the infrastructure while the modem was in said power conservation mode.

10. The method of claim 7 wherein said step of determining when said message is deliverable resulted from the host terminal initiating an inbound message.

11. The method of claim 10 further including a step of registering with the infrastructure and transmitting said inbound message.

12. In a data communications system having an infrastructure, and a modem, the modem registered with the infrastructure and adapted to provide data communications between a host terminal and the infrastructure, a method of modem power conservation including the steps of:

entering, at the modem, a power conservation mode after a first predetermined time has lapsed without data message activity between the modem and the host terminal;

exiting said power conservation mode after a second predetermined time has lapsed, and then registering with the infrastructure;

receiving, at the modem, a message;

determining that said message is not deliverable to the host terminal; and entering, at the modem responsive to said determining step, said power conservation mode.

13. The method of claim 12 wherein said step of entering includes a step of de-registering with the infrastructure.

14. The method of claim 13 further including, after the step of receiving the message, a step of activating an indicator.

15. The method of claim 13 further including a step of receiving, at the modem, non-acknowledged messages stored by the infrastructure while the modem was in said power conservation mode.

16. The method of claim 12 including a step of exiting said power conservation mode when the host terminal initiates an inbound message.

17. The method of claim 16 further including a step of registering with the infrastructure and transmitting said inbound message.

18. The method of claim 12 further including, after the step of receiving the message, the step of activating an indicator, said indicator denoting receipt of said message.

19. The method of claim 12 wherein said step of entering further includes a step of de-registering the modem from the infrastructure.

20. The method of claim 19 further including a step of determining when said message is deliverable to the host terminal and exiting said power conservation mode.

21. The method claim 20 further including the step of registering with the infrastructure.

22. The method of claim 21 further including a step of receiving, at the modem, non-acknowledged messages stored by the infrastructure while the modem was in said power conservation mode.

23. The method of claim 20 wherein said step of determining when said message is deliverable resulted from the host terminal initiating an inbound message.

24. The method of claim 23 further including a step of registering with the infrastructure and transmitting said inbound message.

25. The method of claim 12 further including a step of determining when said message is deliverable to the host terminal and exiting said power conservation mode.

26. The method of claim 25 wherein said step of determining when said message is deliverable resulted from the host terminal initiating an inbound message.

27. The method of claim 26 further including a step of registering with the infrastructure and transmitting said inbound message.

* * * * *